United States Patent
Matsuura

(10) Patent No.: US 6,657,576 B2
(45) Date of Patent: Dec. 2, 2003

(54) QUANTIZATION UNIT SETTING APPARATUS, QUANTIZATION UNIT SETTING METHOD, CODING APPARATUS, CODING METHOD, AND INFORMATION RECORD MEDIUM

(75) Inventor: Koji Matsuura, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/028,421

(22) Filed: Dec. 28, 2001

(65) Prior Publication Data

US 2002/0087933 A1 Jul. 4, 2002

(30) Foreign Application Priority Data

Dec. 28, 2000 (JP) .................................... P. 2000-400532

(51) Int. Cl.[7] .............................................. H03M 7/00
(52) U.S. Cl. ......................................... 341/200; 341/50
(58) Field of Search ............................. 341/200, 51, 50

(56) References Cited

U.S. PATENT DOCUMENTS

| | | | | |
|---|---|---|---|---|
| 4,430,670 A | * | 2/1984 | Netravali | 375/240.12 |
| 4,488,175 A | * | 12/1984 | Netravali | 348/409.1 |
| 4,831,636 A | * | 5/1989 | Taniguchi et al. | 375/245 |
| 4,965,580 A | * | 10/1990 | Tasaki et al. | 341/106 |
| 5,412,484 A | | 5/1995 | Yoshikawa | 358/433 |
| 5,489,942 A | * | 2/1996 | Kawahara | 375/240.12 |
| 5,708,509 A | | 1/1998 | Abe | 358/426 |
| 5,946,652 A | * | 8/1999 | Heddle | 704/230 |
| 6,118,822 A | * | 9/2000 | Bist | 375/240.03 |
| 6,272,175 B1 | * | 8/2001 | Sriram et al. | 375/240 |

FOREIGN PATENT DOCUMENTS

EP 490539 A2 6/1992 .......... H04N/7/137

OTHER PUBLICATIONS

M.P. Eckert, et al., "Perceptual Quality Metrics Applied to Still Image Compression", Signal Processing, vol. 70, No. 3, Nov. 30, 1998 pp. 177–200.

* cited by examiner

Primary Examiner—Peguy JeanPierre
(74) Attorney, Agent, or Firm—Sughrue Mion, PLLC

(57) ABSTRACT

A quantizer scale setting apparatus for setting a quantizer scale used when a digital information signal Sd is quantized has an adder 12 for making a precalculation of a quantization error occurring when the digital information signal Sd is quantized using a plurality of quantizer scales for each of the quantizer scales, and an error control section 10 for setting the quantizer scale used for quantizing the digital information signal Sd from among the plurality of quantizer scales based on the quantization errors whose precalculation is made.

24 Claims, 3 Drawing Sheets

QUANTIZATION UNIT SETTING APPARATUS, QUANTIZATION UNIT SETTING METHOD, CODING APPARATUS, CODING METHOD, AND INFORMATION RECORD MEDIUM

BACKGROUND OF THE INVENTION

1. Field of the Invention

This invention relates to a quantization unit setting apparatus, a quantization unit setting method, a coding apparatus, a coding method, and an information record medium and more particularly to a quantization unit setting apparatus and a quantization unit setting method for performing more precise quantization processing, a coding apparatus and a coding method containing the quantization unit setting apparatus, and an information record medium recording a quantization unit setting program or a coding program as a computer-readable medium.

2. Description of the Related Art

In recent years, as a coding processing standard for compressing and coding image information containing a still image or a moving image, MPEG (Moving Picture Experts Group) has been standardized as international standard.

At this time, in order to code image information, it is a common practice to perform so-called quantization processing for image information as a preceding stage of coding the image information. The quantization processing is executed by dividing the luminance signal value or the color-difference signal value for each of pixels (or for each of pixel units each containing a preset number of pixels) making up the image information by a quantization unit (generally, called a quantizer scale or quantization step width in some cases, for example, in above-mentioned MPEG. Hereinafter, the quantization unit will be called a quantizer scale whenever necessary).

In coding processing of the MPEG, etc., in the related art, as the method of determining the value of the quantization unit, simply the more complicated the image information contents, the larger the value assigned to the quantization unit in the allowable range preset for the value of the quantization unit.

However, in the described coding processing in the related art, simply the more complicated the image information contents, the larger the value assigned to the quantization unit and thus so-called quantization noise (generally, called quantization error in some cases) may grow exceeding the allowable range and consequently, proper quantization processing is not executed and as a result, precise coding processing cannot be performed; this is a problem.

SUMMARY OF THE INVENTION

It is therefore an object of the invention to provide a quantization unit setting apparatus and a quantization unit setting method for performing appropriate quantization processing for lessening a quantization error, thereby consequently making it possible to execute coding processing with high accuracy, a coding apparatus and a coding method containing the quantization unit setting apparatus, and an information record medium recording a quantization unit setting program or a coding program as a computer-readable medium.

To solve the above-described problems, there is provided a quantization unit setting apparatus for setting a quantization unit used when information is quantized, the quantization unit setting apparatus comprising a precalculator of an adder, etc., for making a precalculation of a quantization error occurring when the information is quantized using a plurality of quantization units for each of the quantization units, and a setting section of an error control section, etc., for setting the quantization unit used for quantizing the information from among the plurality of quantization units based on the quantization errors whose precalculation is made.

Thus, the quantizer unit actually used for quantization is set based on the quantization errors whose precalculation is made corresponding to a plurality of quantizer units, so that the information can be quantized appropriately considering the quantization errors.

In the quantization unit setting apparatus, the precalculator comprises a quantization section for quantizing the information using one of the quantization units for generating quantization information, an inverse quantization section for inversely quantizing the quantization information generated by the quantization section using the one quantization unit for generating inverse quantization information, and a quantization error calculation section for calculating the difference between the inverse quantization information generated by the inverse quantization section and the original information as the quantization error corresponding to the one quantization unit.

Thus, the inverse quantization information provided by inversely quantizing the quantization information generated using one quantizer unit based on the quantizer unit is compared with the original information and the quantization error is calculated, so that the precisely calculated quantization error can be used to set the quantizer unit used for quantization.

In the quantization unit setting apparatus, the setting section comprises a determination section of a comparison section, etc., for determining whether or not the value of the quantization error whose precalculation is made corresponding to the one quantization unit is less than a threshold value set based on the time average of dispersion of the quantization errors, and a controller of an error control section, etc., for repeating controlling the precalculator so as to make a precalculation of the quantization error corresponding to another one of the quantization units only when the value of the quantization error is not less than the threshold value, wherein when the value of the quantization error becomes less than the threshold value, the setting section sets the quantization unit so as to quantize the information using the quantization unit corresponding to the quantization error having the value becoming less than the threshold value.

Thus, when the quantization error value corresponding to one quantizer unit becomes less than the threshold value, the quantizer unit is used to quantize the information, so that the calculation amount for setting the quantizer unit can be decreased.

In the quantization unit setting apparatus, the setting section sets the quantization unit so as to quantize the information using the quantization unit corresponding to the smallest one of the quantization errors whose precalculation is made.

Thus, the quantization unit is set so as to use the quantization unit with the smallest quantization error to quantize the information, so that the information can be quantized with higher quality.

To solve the above-described problems, there is provided a coding apparatus comprising a quantization unit setting apparatus, a quantization section of a quantization section, etc., for quantizing the information using the setup quantization unit for generating quantization information, and an information coding section of a variable-length coding section, etc., for coding the quantization information generated by the quantization section to generate coded information.

Thus, the quantization information appropriately quantized considering the quantization noise is used to code the original information, so that the information can be coded with higher accuracy.

To solve the above-described problems, there is provided a quantization unit setting method for setting a quantization unit used when information is quantized, the quantization unit setting method comprising the precalculation step of making a precalculation of a quantization error occurring when the information is quantized using a plurality of quantization units for each of the quantization units and the setting step of setting the quantization unit used for quantizing the information from among the plurality of quantization units based on the quantization errors whose precalculation is made.

Thus, the quantizer unit actually used for quantization is set based on the quantization errors whose precalculation is made corresponding to a plurality of quantizer units, so that the information can be quantized appropriately considering the quantization errors.

In the quantization unit setting method, the precalculation step comprises the quantization step of quantizing the information using one of the quantization units for generating quantization information, the inverse quantization step of inversely quantizing the generated quantization information using the one quantization unit for generating inverse quantization information, and the quantization error calculation step of calculating the difference between the generated inverse quantization information and the original information as the quantization error corresponding to the one quantization unit.

Thus, the inverse quantization information provided by inversely quantizing the quantization information generated using one quantizer unit based on the quantizer unit is compared with the original information and the quantization error is calculated, so that the precisely calculated quantization error can be used to set the quantizer unit used for quantization.

In the quantization unit setting method, the setting section comprises the determination step of determining whether or not the value of the quantization error whose precalculation is made corresponding to the one quantization unit is less than a threshold value set based on the time average of dispersion of the quantization errors, and the control step of repeating controlling so as to make a precalculation of the quantization error corresponding to another one of the quantization units only when the value of the quantization error is not less than the threshold value, wherein when the value of the quantization error becomes less than the threshold value, the quantization unit corresponding to the quantization error having the value becoming less than the threshold value is used to quantize the information.

Thus, when the quantization error value corresponding to one quantizer unit becomes less than the threshold value, the quantizer unit is used to quantize the information, so that the calculation amount for setting the quantizer unit can be decreased.

In the quantization unit setting method, in the setting step, the quantization unit is set so as to quantize the information using the quantization unit corresponding to the smallest one of the quantization errors whose precalculation is made.

Thus, the quantization unit is set so as to use the quantization unit with the smallest quantization error to quantize the information, so that the information can be quantized with higher quality.

According to the invention, there is provided a coding method comprising a quantization unit setting method, the quantization step of quantizing the information using the setup quantization unit for generating quantization information, and the information coding step of coding the generated quantization information to generate coded information.

Thus, the quantization information appropriately quantized considering the quantization noise is used to code the original information, so that the information can be coded with higher accuracy.

According to the invention, there is provided an information record medium recording a quantization unit setting program for causing a computer contained in a quantization unit setting apparatus for setting a quantization unit used when information is quantized, to function as a precalculator for making a precalculation of a quantization error occurring when the information is quantized using a plurality of quantization units for each of the quantization units, and a setting section for setting the quantization unit used for quantizing the information from among the plurality of quantization units based on the quantization errors whose precalculation is made, the information record medium being readable by the computer.

Thus, the computer functions so as to set the quantizer unit actually used for quantization based on the quantization errors whose precalculation is made corresponding to a plurality of quantizer units, so that the information can be quantized appropriately considering the quantization errors.

In the information record medium recording the quantization unit setting program for causing the computer functioning as the precalculator to function as a quantization section for quantizing the information using one of the quantization units for generating quantization information, an inverse quantization section for inversely quantizing the quantization information generated by the quantization section using the one quantization unit for generating inverse quantization information, and a quantization error calculation section for calculating the difference between the inverse quantization information generated by the inverse quantization section and the original information as the quantization error corresponding to the one quantization unit, the information record medium being readable by the computer.

Thus, the computer functions so as to compare the inverse quantization information provided by inversely quantizing the quantization information generated using one quantizer unit based on the quantizer unit with the original information and the quantization error is calculated, so that the precisely calculated quantization error can be used to set the quantizer unit used for quantization.

In the information record medium recording the quantization unit setting program for causing the computer functioning as the setting section to function as a determination section for determining whether or not the value of the quantization error whose precalculation is made corresponding to the one quantization unit is less than a threshold value set based on the time average of dispersion of the quantization errors, and a controller for repeating controlling the precalculator so as to make a precalculation of the quantization error corresponding to another one of the quantization units only when the value of the quantization error is not less than the threshold value, for also casing the computer to function, when the value of the quantization error becomes less than the threshold value, so as to set the quantization unit so as to quantize the information using the quantization unit corresponding to the quantization error having the value becoming less than the threshold value, the information record medium being readable by the computer.

Thus, when the quantization error value corresponding to one quantizer unit becomes less than the threshold value, the computer functions so as to use the quantizer unit to quantize the information, so that the calculation amount for setting the quantizer unit can be decreased.

In the information record medium recording the quantization unit setting program for causing the computer functioning as the setting section to function so as to set the quantization unit so as to quantize the information using the quantization unit corresponding to the smallest one of the quantization errors whose precalculation is made, the information record medium being readable by the computer.

Thus, the computer functions so as to set the quantization unit so as to use the quantization unit with the smallest quantization error to quantize the information, so that the information can be quantized with higher quality. Thus, use the quantizer unit with the smallest quantization error to quantize the information, so that the information can be quantized with higher quality.

According to the invention, there is provided an information record medium recording a quantization unit setting program, and a coding program for causing a coding computer contained in a coding apparatus to function as a quantization section for quantizing the information using the setup quantization unit for generating quantization information, and an information coding section for coding the quantization information generated by the quantization section to generate coded information, the information record medium being readable by the computer and the coding computer.

Thus, the coding computer functions so as to use the quantization information appropriately quantized considering the quantization noise to code the original information, so that the information can be coded with higher accuracy.

DETAILED DESCRIPTION OF THE PRESENT INVENTION

The features of the invention are outlined below before specific embodiments are described:

In the related art, to set the quantization unit, simply the more complicated the image information contents, the larger the value assigned to the quantization unit, as described above. The reason is that in the related art, the higher the compression rate (namely, the larger the quantization unit), the more degraded the post-coded image quality, and therefore essentially a precalculation of a quantization error need not be executed to set the quantization unit.

In contrast, the applicant of the invention has found that the magnitude of the compression rate and the degree of image quality degradation do not necessarily involve the correspondence therebetween because of the effect of a quantization error, and a precalculation of a quantization error is made before the quantization unit is set, as described below:

Referring now to the accompanying drawings (FIGS. 1 to 3), there is shown a preferred embodiment of the invention.

The embodiment will be discussed as the invention is applied to a coding apparatus for compressing and coding image information containing a still image and a moving image in conformity with MPEG.

Figure 1:
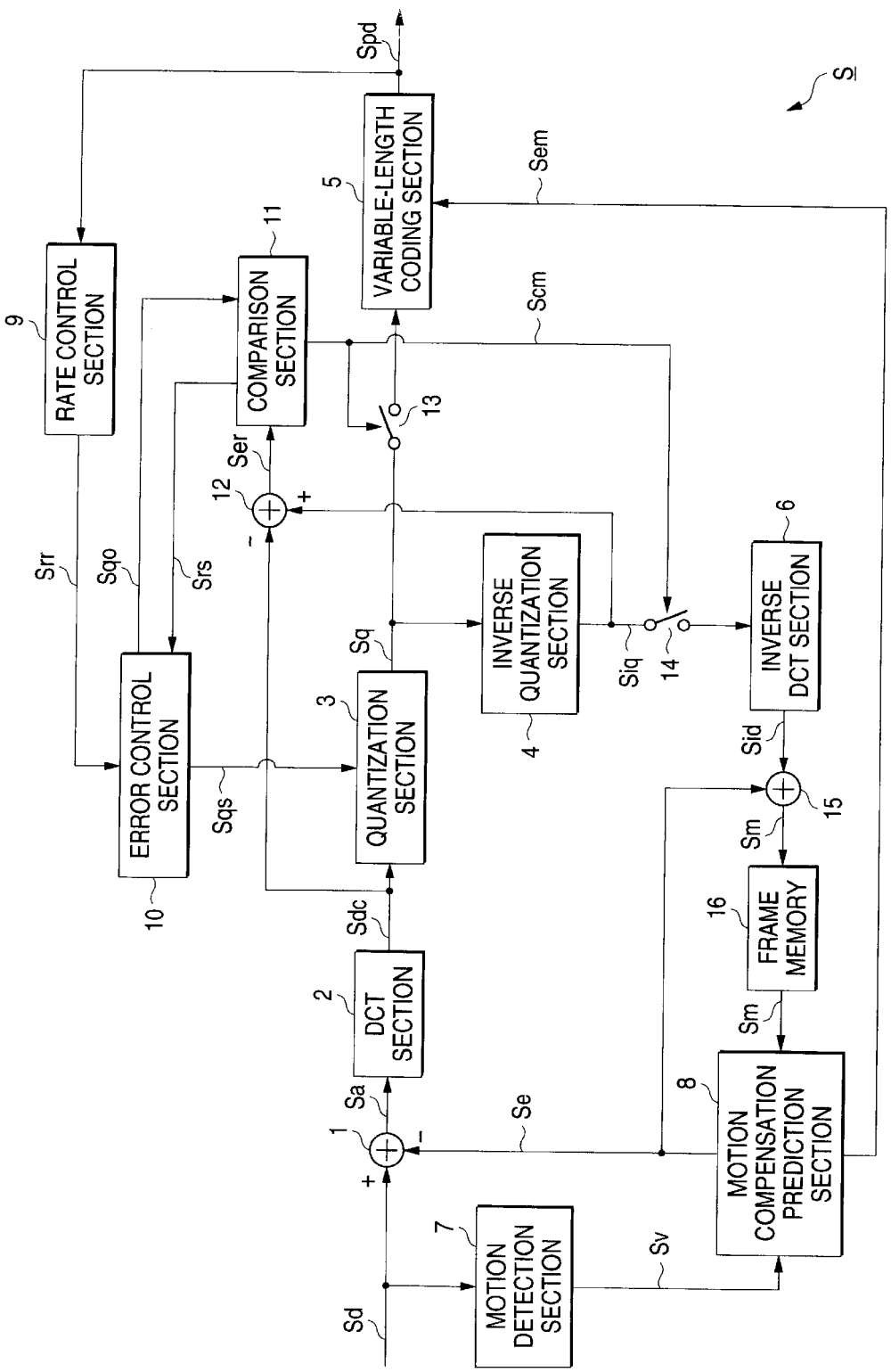
FIG. 1 is a block diagram to show a general configuration of a coding apparatus according to an embodiment of the invention.
Figure 2:
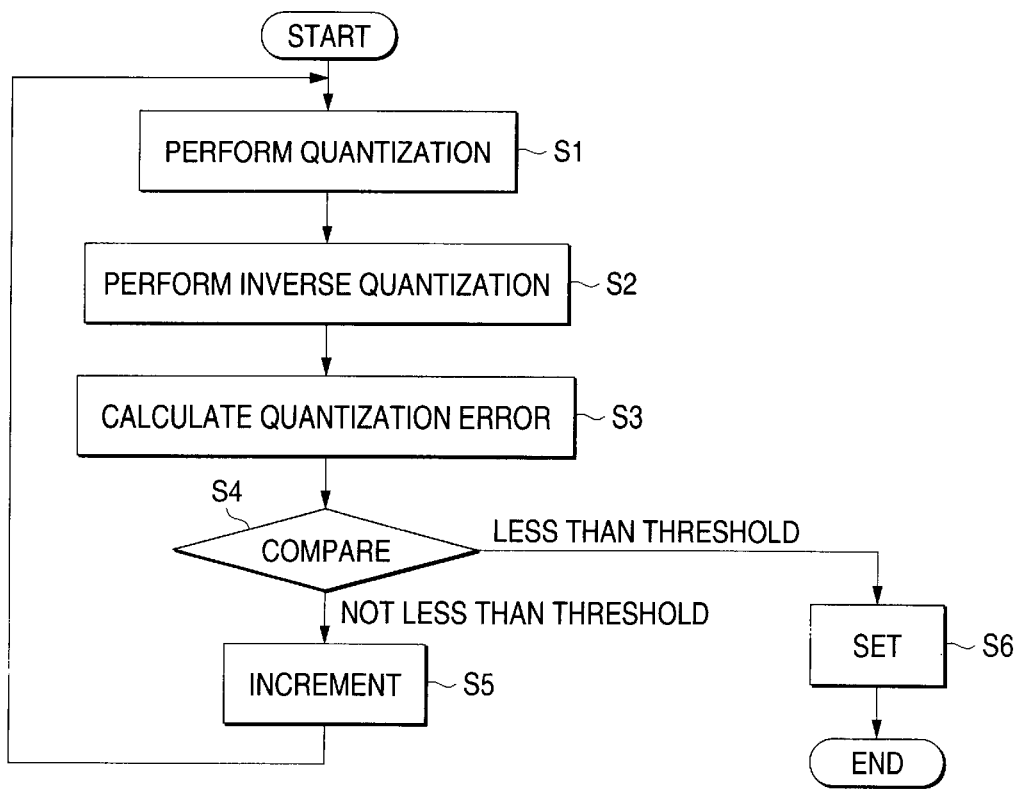
FIG. 2 is a flowchart to show a quantizer scale setting processing of the embodiment of the invention.
Figure 3:
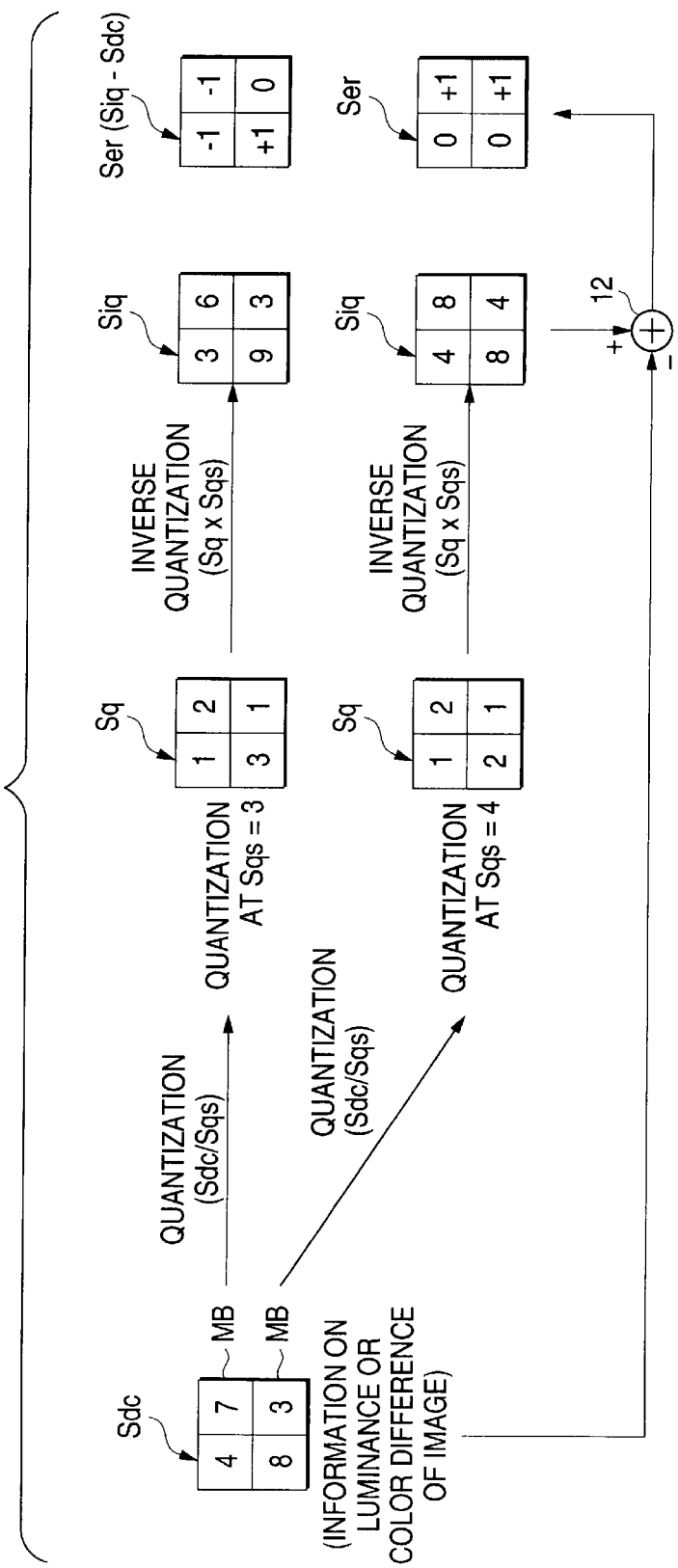
FIG. 3 is a drawing to describe the quantizer scale setting processing of the embodiment of the invention.

FIG. 1 is a block diagram to show the general configuration of a coding apparatus according to the embodiment, FIG. 2 is a flowchart to show quantizer scale setting processing of the embodiment, and FIG. 3 is a schematic drawing to show the quantizer scale setting processing.

Here, the coding based on MPEG is outlined. MPEG is a coding technology wherein DCT (Discrete Cosine Transform) is performed for the difference between the image to be coded and a reference image preceding or following the image in time sequence and the difference between information provided by quantization and a motion vector (if some image motion exists between the reference image and the image to be coded, a vector indicating the direction and amount of the motion) in macro block (square pixel block containing 16 pixels×16 pixels in the image) units is coded in variable length and transmitted or recorded, thereby making it possible to compress with high efficiency the image information otherwise resulting in an enormous information amount.

Next, the configuration of the coding apparatus according to the embodiment will be discussed with reference to FIG. 1.

As shown in FIG. 1, the coding apparatus S of the embodiment is made up of adders 1 and 15 and an adder 12 as a precalculator and a quantization error calculation section, a DCT section 2, a quantization section 3 as a quantization section, an inverse quantization section 4 as an inverse quantization section, a variable-length coding section 5 as an information coding section, an inverse DCT section 6, a motion detection section 7, a motion compensation prediction section 8, a rate control section 9, an error control section 10 as a setting section and a controller, a comparison section 11 as a determination section, switches 13 and 14, and frame memory 16.

Next, the operation of the coding apparatus S will be discussed with reference to FIGS. 1 to 3.

To begin with, normal coding processing executed in conformity with MPEG using a quantizer scale set by quantizer scale setting processing described later will be discussed.

In the normal coding processing, the switches 13 and 14 are turned on based on a switch control signal Scm from the comparison section 11.

As shown in FIG. 1, a digital information signal Sd (image information of the digital information signal Sd is made up of a plurality of frame images and is digitized for each of the pixels making up each frame) externally input to the coding apparatus S is input to the motion detection section 7 and is also input to the adder 1.

The motion detection section 7 calculates the above-mentioned motion vector for each frame in the digital information signal Sd and outputs a vector signal Sv corresponding to the motion vector to the motion compensation prediction section 8.

Here, the motion vector will be discussed in detail. It is used for motion compensation processing executed when a moving image is compressed based on MPEG.

That is, in the motion compensation processing, first the image to be coded is divided into the above-mentioned macro blocks each containing a predetermined number of pixels and the absolute value of the difference between each pixel in each of the macro blocks and the corresponding pixel in either the preceding or following frame on the time axis is found and then the space position of the image with the minimum absolute value sum resulting from adding the absolute values relative to all pixels in the macro block (namely, the image in either the preceding or following frame closest to the image in the macro block) is found.

The move relationship between the macro block and the image closest thereto is adopted as the above-mentioned motion vector and this motion vector is coded as information indicating the image in either the preceding or following frame. Accordingly, the amount of the information actually coded can be fairly compressed for coding the image information as compared with the case where the image information itself is coded.

Next, from the digital information signal Sd output to the adder 1, a compensation signal Se from the motion compensation prediction section 8 is subtracted in the adder 1 and the result is output to the DCT section 2 as a subtraction signal Sa.

Next, the DCT section 2 performs DCT for the subtraction signal Sa to compress the information amount and outputs the result to the quantization section 3 and the adder 12 as a conversion signal Sdc.

The quantization section 3 quantizes the conversion signal Sdc using the quantizer scale indicated by a quantizer scale signal Sqs (described later) to generate a quantization signal Sq and outputs the quantization signal Sq to the inverse quantization section 4 and also outputs the signal to the variable-length coding section 5.

Next, the inverse quantization section 4 performs inverse quantization processing for the quantization signal Sq to generate an inverse quantization signal Siq and outputs the inverse quantization signal Siq to the inverse DCT section 6 via the switch 14.

The inverse DCT section 6 performs inverse DCT (inverse discrete cosine transform) for the inverse quantization signal Siq to generate an inverse DCT signal Sid and outputs the inverse DCT signal Sid to the adder 15.

Then, the adder 15 adds the compensation signal Se and the inverse DCT signal Sid to generate an addition signal Sm (the current frame image is decompressed by the addition processing) and outputs the addition signal Sm to the frame memory 16.

The frame memory temporarily stores the addition signal Sm only for the time corresponding to one frame and outputs the signal to the motion compensation prediction section 8 as the addition signal Sm indicating the immediately preceding frame image.

Then, the motion compensation prediction section 8 performs motion compensation processing using interframe prediction in MPEG based on the motion vector contained in the vector signal Sv and the addition signal Sm to generate the above-mentioned compensation signal Se to compress the information amount and outputs the compensation signal Se to the adders 1 and 15.

Concurrently, the motion compensation prediction section 8 generates a mode signal Sem indicating the motion vector prediction mode used in the above-mentioned motion compensation processing and out puts the mode signal Sem to the variable-length coding section 5.

The variable-length coding section 5 performs variable-length coding processing for the above-mentioned quantization signal Sq based on the motion vector prediction mode indicated by the mode signal Sem and outputs a compressed information signal Spd provided by compressing and coding the original digital information signal Sd in MPEG to coding buffer memory (not shown).

At this time, the rate control section 9 generates a rate signal Srr to optimize the quantizer scale (the quantizer scale for quantizing in the quantization section 3 (in other words, the coding rate in the compressed information signal Spd)) based on the coding rate in the compressed information signal Spd and outputs the rate signal Srr to the error control section 10.

Then, the error control section 10 generates a quantization scale signal Sqs containing the quantizer scale set by quantization scale setting processing (described later) based on the rate signal Srr from the rate control section 9 and out puts the quantization scale signal Sqs to the quantization section 3.

Next, the quantization scale setting processing according to the embodiment for setting the quantizer scale used in executing the above-described normal coding processing will be discussed with reference to FIGS. 1 to 3.

The quantization scale setting processing is executed ina time-division manner with the above-described normal coding processing and the normal coding processing using the quantizer scale set by the quantization scale setting processing is repeated for each macro block in the digital information signal Sd, for example. Only when the quantization scale setting processing is executed, the switches 13 and 14 are turned off the switch control signal Scm from the comparison section 11.

In the quantization scale setting processing of the embodiment, when the switches 13 and 14 are turned off based on the switch control signal Scm from the comparison section 11 and the quantization scale setting processing is started, first the error control section 10 outputs the initial value of the quantizer scale to the comparison section 11 as an initial value signal Sq0 for initializing the comparison section 11.

Upon completion of the initialization processing, then the DCT section 2 outputs the conversion signal Sdc to the adder 12 and concurrently the quantization section 3 quantizes the conversion signal Sdc using the initial value of the quantizer scale (step S1 in FIG. 2) and outputs the result to the inverse quantization section 4 as the quantization signal Sq.

At this time, as the conversion signal Sdc, specifically, as shown at the left end of FIG. 3, the luminance signal value or the color-difference signal value for each micro block MB is generated and is output to the adder 12 and the quantization section 3, which then performs quantization based on the quantizer scale having the value indicated by the quantization scale signal Sqs output from the error control section 10 at the time. As the quantization is performed, the luminance signal value or the color-difference signal value for each micro block MB (the conversion signal Sdc) is divided by the quantizer scale value to generate a quantization signal Sq (for example, see the second from the left of the upper stage in FIG. 3).

Next, the inverse quantization section 4 inversely quantizes the quantization signal Sq (step S2 in FIG. 2) to generate an inverse quantization signal Siq and outputs the inverse quantization signal Siq to the adder 12.

At this time, as the inverse quantization processing, more particularly, the luminance signal value or the color-difference signal value for each micro block MB contained in the quantization signal Sq is multiplied by the quantizer scale value used for the quantization at step S1 in FIG. 2 to generate the inverse quantization signal Siq (for example, see the third from the left of the upper stage in FIG. 3).

Then, the adder 12 subtracts the inverse quantization signal Siq from the conversion signal Sdc before quantization (step S3 in FIG. 2) to generate an error signal Ser indicating a quantization error resulting from the quantization in the quantization section 3 and outputs the error signal Ser to the comparison section 11.

More particularly, as shown at the right end of FIG. 3, the conversion signal Sdc is subtracted from the inverse quantization signal Siq for each macro block MB to generate the error signal Ser for each macro block MB.

The comparison section 11 compares the value of the error signal Ser with a preset threshold value (step S4 in FIG. 2). If the value of the error signal Ser is equal to or greater than the preset threshold value (equal to or greater than threshold value at step S4 in FIG. 2), it is determined that the quantizer scale value used for the quantization processing in the quantization section 3 at the time is not proper, and the value is incremented (step S5 in FIG. 2). To evaluate the quantizer scale value after being incremented, the process returns to step S1 in FIG. 2 and again the steps S1 to S5 in FIG. 2 described above are repeated. More particularly, as shown at the lower stage of FIG. 3, the quantizer scale value is incremented by one and then the steps S1 to S5 are repeated.

At this time, specifically the threshold value is preset, for example, based on the time average of dispersion of a plurality of quantization errors each indicated by the error signal Ser. More specifically, it is known that assuming that the original digital information Sd is a uniform distribution, the time average value becomes a value resulting from dividing the square of the quantizer scale value at the time by 12, and the value is used intact as the threshold value in the comparison processing at the time.

Incrementing the quantizer scale value described above is not limited to simple adding (namely, $Q_n \leftarrow Q_{n-1}+1$) or subtraction (namely, $Q_n \leftarrow Q_{n-1}-1$) and may be, for example, operation such as $Q_n \leftarrow S (Q_{n-1}+t)$ (S and t are integers)

On the other hand, if it is determined at step S4 in FIG. 2 that the value of the error signal Ser is suppressed to less than the threshold value (less than threshold value at step S4 in FIG. 2), the comparison section 11 outputs a comparison result signal Srs to set the quantizer scale value used for the normal coding processing executed just after the quantization scale setting processing as the quantizer scale value becoming less than the threshold value (namely, set so as to be output as the quantizer scale signal Sqs from the error control section 10) to the error control section 10 (step S6 in FIG. 2) and the quantization scale setting processing of the embodiment is terminated.

After this, the switches 13 and 14 are turned on based on the switch control signal Scm from the comparison section 11 and the normal coding processing sequence described above is executed using the quantizer scale set by the method previously described with reference to FIGS. 2 and 3.

As described above, according to the setting method of the quantizer scale in the coding apparatus S of the embodiment, the quantizer scale actually used for quantization is set based on the quantization errors whose precalculation is made corresponding to a plurality of quantizer scales, so that the conversion signal Sdc can be quantized appropriately considering the quantization errors.

The inverse quantization signal Siq provided by inversely quantizing the quantization signal Sq generated using one quantizer scale based on the quantizer scale is compared with the original conversion signal Sdc and the quantization error is calculated, so that the precisely calculated quantization error can be used to set the quantizer scale used for quantization.

Further, when the quantization error value corresponding to one quantizer scale becomes less than the threshold value, the quantizer scale is used to quantize the conversion signal Sdc, so that the calculation amount for setting the quantizer scale can be decreased.

Further, the quantization signal Sq appropriately quantized considering the quantization noise is used to code the original digital information signal Sd, so that the information can be coded with higher accuracy.

In the described embodiment, when the calculated quantization error is less than the threshold value, the quantizer scale corresponding to the quantization error at the time is used to perform quantization. In addition, the quantization error values examined about a plurality of quantizer scales can be temporarily stored and the quantizer scale corresponding to the quantization error having a value less than the threshold value, the value being the smallest value among the quantization error values can also be used to perform the later quantization.

In this case, the quantizer scale with the smallest quantization error is used to quantize the conversion signal Sdc, so that the conversion signal Sdc can be quantized with higher quality.

In the described embodiment, the case wherein the invention is applied to coding of the digital information Sd containing image information in conformity with MPEG has been described; in addition, the invention can be applied to any coding system if the coding system involves quantization.

Further, the following is also possible: The program corresponding to the flowchart of FIG. 2 is recorded on a flexible disk, a hard disk, etc., as an information record medium and is read by a general-purpose personal computer, etc., for execution, whereby the personal computer is made to function as the error control section 10, the comparison section 11, or the like of the embodiment for executing the quantizer scale setting processing of the embodiment.

According to the invention, the quantizer unit actually used for quantization is set based on the quantization errors whose precalculation is made corresponding to a plurality of quantizer units, so that the information can be quantized appropriately considering the quantization errors.

Therefore, appropriate quantization processing is used, whereby coding processing can be performed with high accuracy.

According to the invention, the inverse quantization information provided by inversely quantizing the quantization information generated using one quantizer unit based on the quantizer unit is compared with the original information and the quantization error is calculated, so that the precisely calculated quantization error can be used to set the quantizer unit used for quantization.

According to the invention, when the quantization error value corresponding to one quantizer unit becomes less than the threshold value, the quantizer unit is used to quantize the information, so that the calculation amount for setting the quantizer unit can be decreased.

According to the invention, the quantization unit is set so as to use the quantization unit with the smallest quantization error to quantize the information, so that the information can be quantized with higher quality.

According to the invention, the quantization information appropriately quantized considering the quantization noise is used to code the original information, so that the information can be coded with higher accuracy.

According to the invention, the quantizer unit actually used for quantization is set based on the quantization errors whose precalculation is made corresponding to a plurality of quantizer units, so that the information can be quantized appropriately considering the quantization errors.

Therefore, appropriate quantization processing is used, whereby coding processing can be performed with high accuracy.

According to the invention, the inverse quantization information provided by inversely quantizing the quantization information generated using one quantizer unit based on the quantizer unit is compared with the original information and the quantization error is calculated, so that the precisely calculated quantization error can be used to set the quantizer unit used for quantization.

According to the invention, when the quantization error value corresponding to one quantizer unit becomes less than the threshold value, the quantizer unit is used to quantize the information, so that the calculation amount for setting the quantizer unit can be decreased.

According to the invention, the quantization unit is set so as to use the quantization unit with the smallest quantization error to quantize the information, so that the information can be quantized with higher quality.

According to the invention, the quantization information appropriately quantized considering the quantization noise is used to code the original information, so that the information can be coded with higher accuracy.

According to the invention, the computer functions so as to set the quantizer unit actually used for quantization based on the quantization errors whose precalculation is made corresponding to a plurality of quantizer units, so that the information can be quantized appropriately considering the quantization errors.

Therefore, appropriate quantization processing is used, whereby coding processing can be performed with high accuracy.

According to the invention, the computer functions so as to compare the inverse quantization information provided by inversely quantizing the quantization information generated using one quantizer unit based on the quantizer unit with the original information and the quantization error is calculated, so that the precisely calculated quantization error can be used to set the quantizer unit used for quantization.

According to the invention, when the quantization error value corresponding to one quantizer unit becomes less than the threshold value, the computer functions so as to use the quantizer unit to quantize the information, so that the calculation amount for setting the quantizer unit can be decreased.

According to the invention, the computer functions so as to set the quantization unit so as to use the quantization unit with the smallest quantization error to quantize the information, so that the information can be quantized with higher quality.

Thus, use the quantizer unit with the smallest quantization error to quantize the information, so that the information can be quantized with higher quality.

According to the invention, the coding computer functions so as to use the quantization information appropriately quantized considering the quantization noise to code the original information, so that the information can be coded with higher accuracy.

What is claimed is:

1. A quantization unit setting apparatus for setting a quantization unit used for quantizing information, the quantization unit setting apparatus comprising:

a precalculator for precalculating a quantization error for each of a plurality of quantization units, the quantization error occurring upon quantizing the information using each of the quantization units; and a setting section for selecting one of the quantization units to be used for actual quantization calculation of the information, based on the quantization errors.

2. The quantization unit setting apparatus as claimed in claim 1, wherein the precalculator comprises:

a quantization section for quantizing the information using one of the quantization units to generate quantization information;

an inverse quantization section for inversely quantizing the quantization information using the one of the quantization units for generating inverse quantization information; and a quantization error calculation section for calculating a difference between the inverse quantization information and the information to be the quantization error corresponding to the one of the quantization units.

3. The quantization unit setting apparatus as claimed claim 1, wherein the setting section selects the quantization unit corresponding to the smallest one of the quantization errors.

4. A coding apparatus comprising:

a quantization unit setting apparatus for setting a quantization unit used for quantizing information, the quantization unit setting apparatus comprising:

a precalculator for precalculating a quantization error for each of a plurality of quantization units, the quantization error occurring upon quantizing the information using each of the quantization units; and a setting section for selecting one of the quantization units to be used for actual quantization calculation of the information, based on the quantization errors;

a quantization section for quantizing the information using the selected quantization unit to generate quantization information; and an information coding section for coding the quantization information to generate coded information.

5. The coding apparatus as claimed in claim 4, wherein the precalculator comprises:

a quantization section for quantizing the information using one of the quantization units to generate quantization information;

an inverse quantization section for inversely quantizing the quantization information using the one of the quantization units for generating inverse quantization information; and a quantization error calculation section for calculating a difference between the inverse quantization information and the information to be the quantization error corresponding to the one of the quantization units.

6. The coding apparatus as claimed claim 4, wherein the setting section selects the quantization unit corresponding to the smallest one of the quantization errors.

7. A quantization unit setting method for setting a quantization unit used for quantizing information, the quantization unit setting method comprising:
   precalculating a quantization error for each of a plurality of quantization units, the quantization error occurring upon quantizing the information using each of the quantization units; and
   selecting one of the quantization units to be used for actual quantization calculation of the information, based on the quantization errors.

8. The quantization unit setting method as claimed in claim 7, wherein the precalculating step comprises:
   quantizing the information using one of the quantization units to generate quantization information;
   inversely quantizing the quantization information using the one of the quantization units for generating inverse quantization information; and
   calculating a difference between the inverse quantization information and the information to be the quantization error corresponding to the one of the quantization units.

9. The quantization unit setting method as claimed claim 7, wherein the setting step selects the quantization unit corresponding to the smallest one of the quantization errors.

10. A coding method comprising:
    precalculating a quantization error for each of a plurality of quantization units, the quantization error occurring upon quantizing information using each of the quantization units;
    selecting one of the quantization units to be used for actual quantization calculation of the information, based on the quantization errors;
    quantizing the information using the selected one of the quantization units to generate quantization information; and
    coding the generated quantization information to generate coded information.

11. The coding method as claimed in claim 10, wherein the precalculating step comprises:
    quantizing the information using one of the quantization units to generate quantization information;
    inversely quantizing the quantization information using the one of the quantization units for generating inverse quantization information; and
    calculating a difference between the inverse quantization information and the information to be the quantization error corresponding to the one of the quantization units.

12. The coding apparatus as claimed claim 10, wherein the setting section selects the quantization unit corresponding to the smallest one of the quantization errors.

13. An information recording medium recording a quantization unit setting program to be executed in a computer for setting a quantization unit used for quantizing information, the program comprising:
    precalculating a quantization error for each of a plurality of quantization units, the quantization error occurring upon quantizing the information using each of the quantization units; and
    selecting one of the quantization units to be used for actual quantization calculation of the information, based on the quantization errors.

14. The information recording medium as claimed in claim 13, wherein the precalculating step comprises:
    quantizing the information using one of the quantization units to generate quantization information;
    inversely quantizing the quantization information using the one of the quantization units for generating inverse quantization information; and
    calculating a difference between the inverse quantization information and the information to be the quantization error corresponding to the one of the quantization units.

15. The information recording medium as claimed in claim 13, wherein the setting step selects the quantization unit corresponding to the smallest one of the quantization errors.

16. An information recording medium recording a program to be executed in a computer, the program comprising:
    precalculating a quantization error for each of a plurality of quantization units, the quantization error occurring upon quantizing information using each of the quantization units;
    selecting one of the quantization units to be used for actual quantization calculation of the information, based on the quantization errors;
    quantizing the information using the selected one of the quantization units to generate quantization information; and
    coding the generated quantization information to generate coded information.

17. The information recording medium as claimed in claim 16, wherein the precalculating step comprises:
    quantizing the information using one of the quantization units to generate quantization information;
    inversely quantizing the quantization information using the one of the quantization units for generating inverse quantization information; and
    calculating a difference between the inverse quantization information and the information to be the quantization error corresponding to the one of the quantization units.

18. The information recording medium as claimed in claim 16, wherein the setting section selects the quantization unit corresponding to the smallest one of the quantization errors.

19. A quantization unit setting apparatus for setting a quantization unit used for quantizing information, the quantization unit setting apparatus comprising:
    a precalculator for precalculating a quantization error for each of a plurality of quantization units, the quantization error occurring upon quantizing the information using each of the quantization units; and
    a setting section for selecting one of the quantization units to be used for actual quantization calculation of the information, based on the quantization errors,
    wherein the setting section comprises:
      a determination section for determining whether the quantization error corresponding to the one of the quantization units is less than a threshold value set based on the time average of dispersion of the quantization errors; and
      a controller for continuously controlling the precalculator to precalculate the quantization error corresponding to another one of the quantization units only when the quantization error is not less than the threshold value,
    wherein when the quantization error is less than the threshold value using the one of the quantization units, the setting section selects the one of the quantization units to be used for quantizing the information.

20. A coding apparatus comprising:
    a quantization unit setting apparatus for setting a quantization unit used for quantizing information, the quantization unit setting apparatus comprising:

a precalculator for precalculating a quantization error for each of a plurality of quantization units, the quantization error occurring upon quantizing the information using each of the quantization units; and a setting section for selecting one of the quantization units to be used for actual quantization calculation of the information, based on the quantization errors;

a quantization section for quantizing the information using the selected quantization unit to generate quantization information; and an information coding section for coding the quantization information to generate coded information, wherein the setting section comprises:
a determination section for determining whether the quantization error corresponding to the one of the quantization units is less than a threshold value set based on the time average of dispersion of the quantization errors; and a controller for continuously controlling the precalculator to precalculate the quantization error corresponding to another one of the quantization units only when the quantization error is not less than the threshold value, wherein when the quantization error is less than the threshold value using the one of the quantization units, the setting section selects the one of the quantization units to be used for quantizing the information.

21. A quantization unit setting method for setting a quantization unit used for quantizing information, the quantization unit setting method comprising:

precalculating a quantization error for each of a plurality of quantization units, the quantization error occurring upon quantizing the information using each of the quantization units; and selecting one of the quantization units to be used for actual quantization calculation of the information, based on the quantization errors, wherein the setting step comprises:
determining whether the quantization error corresponding to the one of the quantization units is less than a threshold value set based on the time average of dispersion of the quantization errors; and continuously precalculating the quantization error corresponding to another one of the quantization units only when the quantization error is not less than the threshold value, selecting the one of the quantization units to be used for quantizing the information when the quantization error is less than the threshold value using the one of the quantization units.

22. A coding method comprising:
precalculating a quantization error for each of a plurality of quantization units, the quantization error occurring upon quantizing information using each of the quantization units;

selecting one of the quantization values to be used for actual quantization calculation of the information, based on the quantization errors;

quantizing the information using the selected one of the quantization units to generate quantization information; and coding the generated quantization information to generate coded information, wherein the setting step comprises:
determining whether the quantization error corresponding to the one of the quantization units is less than a threshold value set based on the time average of dispersion of the quantization errors; and continuously precalculating the quantization error corresponding to another one of the quantization units only when the quantization error is not less than the threshold value, selecting the one of the quantization units to be used for quantizing the information when the quantization error is less than the threshold value using the one of the quantization units.

23. An information recording medium recording a quantization unit setting program to be executed in a computer for setting a quantization unit used for quantizing information, the program comprising:

precalculating a quantization error for each of a plurality of quantization units, the quantization error occurring upon quantizing the information using each of the quantization units; and selecting one of the quantization units to be used for actual quantization calculation of the information, based on the quantization errors, wherein the setting step comprises:
determining whether the quantization error corresponding to the one of the quantization units is less than a threshold value set based on the time average of dispersion of the quantization errors; and continuously precalculating the quantization error corresponding to another one of the quantization units only when the quantization error is not less than the threshold value, selecting the one of the quantization units to be used for quantizing the information when the quantization error is less than the threshold value using the one of the quantization units.

24. An information recording medium recording a program to be executed in a computer, the program comprising:

precalculating a quantization error for each of a plurality of quantization units, the quantization error occurring upon quantizing information using each of the quantization units;

selecting one of the quantization units to be used for actual quantization calculation of the information, based on the quantization errors;

quantizing the information using the selected one of the quantization units to generate quantization information; and coding the generated quantization information to generate coded information, wherein the setting step comprises:
determining whether the quantization error corresponding to the one of the quantization units is less than a threshold value set based on the time average of dispersion of the quantization errors; and continuously precalculating the quantization error corresponding to another one of the quantization units only when the quantization error is not less than the threshold value, selecting the one of the quantization units to be used for quantizing the information when the quantization error is less than the threshold value using the one of the quantization units.

* * * * *